Patented May 17, 1932

1,858,286

UNITED STATES PATENT OFFICE

HENRY B. SMITH, OF ROCHESTER, NEW YORK, ASSIGNOR TO EASTMAN KODAK COMPANY, OF ROCHESTER, NEW YORK, A CORPORATION OF NEW YORK

CELLULOSE ACETATE COMPOSITION OF MATTER CONTAINING SALICYL ALDEHYDE

No Drawing.    Application filed September 15, 1931.   Serial No. 562,997.

This invention relates to cellulose acetate compositions, and more particularly to compositions containing cellulose acetate and a plasticizer in such a proportion as will give to the product very high flexibility.

The addition of plasticizers to cellulose acetate for inducing flexibility in the product with which the plasticizer is incorporated has, of course, been practiced for decades, and the plasticizer hereinafter mentioned has even been employed with cellulose acetate in small proportions. However, the flexibility of a sheet made from such a composition of matter, for instance such as photographic film base, is such as permits the sheet to be bent several times, but the sheet has little extensibility and without the use of heat or solvents to soften it it will not conform readily, for instance, to an irregular surface or shape as may well be desired for certain uses.

No one has to my knowledge heretofore incorporated with cellulose acetate the plasticizer herein named in amounts approximately equal to the weight of the cellulose acetate employed, or in other words, approximately 100% of the plasticizer based upon the weight of the cellulose acetate, in order to obtain a more flexible product than that referred to above. Furthermore, it was entirely unexpected that one could incorporate as much as 100% of this plasticizer in a cellulose acetate composition, for the reason that many plasticizers have been found to be incompatible with cellulose acetate in amounts in excess of 50% and frequently in amounts as low as 30% or even 10%; the addition of more than these percentages of the plasticizer merely resulted in the plasticizer crystallizing out, the solution gelling, the product becoming hazy or opaque, or otherwise becoming useless.

I have found that, upon the addition to cellulose acetate of approximately 100% of this plasticizer, quite unexpected compatibility of the plasticizer with the cellulose acetate exists and also that quite unexpected flexibility, plasticity and clarity of the final product results. Such compositions have great utility where a highly flexible compound is desired, such as the coating of a base (for instance, cloth or other fabric) in the production of artificial leather or the production of relatively thin sheets wherein more than the usual flexibility is important. Such a composition, if converted, for instance, into sheet form, will be found to be supple and non-rigid, and to have the ability to conform readily to a surface upon which it may be placed, and this even at atmospheric temperatures.

It is among the objects of my invention, therefore, to produce a composition of matter containing cellulose acetate which has a high degree of flexibility, plasticity, extensibility and clarity. It is a further object of my invention to employ a certain plasticizer in proportions much higher than heretofore attempted. Another object of my invention is to prepare artificial leather by coating a cellulose acetate-plasticizer composition upon a fabric or other base.

I have found that it is possible to incorporate with 100 parts of cellulose acetate approximately 100 parts (or in other words approximately 100%) of salicyl aldehyde, which has the structural formula

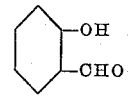

This novel composition of matter is produced by merely mixing the plasticizer with cellulose acetate and then adding sufficient of a common solvent, such as acetone (assuming acetone-soluble cellulose acetate is employed), whereupon an intimate mixture of the plasticizer with the cellulose acetate results. The amount of acetone or other common solvent to be employed varies, of course, within rather wide limits depending upon the fluidity of the composition desired. 100 parts of acetone will suffice for many purposes, although I prefer to use 400 parts. Various high boilers or evaporation retardents, such as ethyl lactate, amyl acetate or the like may also be added if desired, as is well known in this art.

The composition of matter so produced may then be coated into sheets in the usual way by depositing it upon plates or rolls and permitting the solvent to evaporate. If my novel composition is to be employed in the manufacture of artificial leather, it may be coated upon, for instance, a cloth support and the solvent permitted to evaporate, or the cloth support may be caused to pass through the cellulose acetate plasticizer composition and permitted to absorb the solution, the solvent in the coating being then permitted to evaporate. In either case, the solvent may, of course, be recovered if desired by condensing the vapors, etc.

While above and in the claims appended hereto, I have referred to the use of a plasticizer in approximately equal proportions, namely in a ratio of approximately 100%, it will be understood that within this terminology variations of from 10% to 15% less than 100% of plasticizer and as much as 25% to 50% more than 100% of the plasticizer may, in some instances, be desirable.

Thus it will be observed that I have described a method for the preparation of a product containing cellulose acetate, which product is possessed of unusual flexibility and which is very desirable for use in the production of highly flexible cellulose derivative sheeting or other articles of manufacture and which composition is particularly useful in the production of artificial leather by the coating or impregnation of a support, such as cloth, with my novel composition of matter. Other uses for this composition of matter will suggest themselves to those skilled in the various plastic arts.

What I claim as my invention and desire to be secured by Letters Patent of the United States is:—

1. A composition of matter comprising cellulose acetate and approximately an equal amount of salicyl aldehyde.

2. A coated textile which comprises a fabric base coated with a composition of matter comprising cellulose acetate and approximately an equal amount of salicyl aldehyde.

Signed at Rochester, New York, this 9th day of September, 1931.

HENRY B. SMITH.